Feb. 14, 1956  G. AMIARD ET AL  2,734,919
METHOD OF RESOLVING DL-THREO-1-(p-NITRO PHENYL)-2-AMINO PROPANE-1,3-DIOL
Filed Feb. 25, 1953
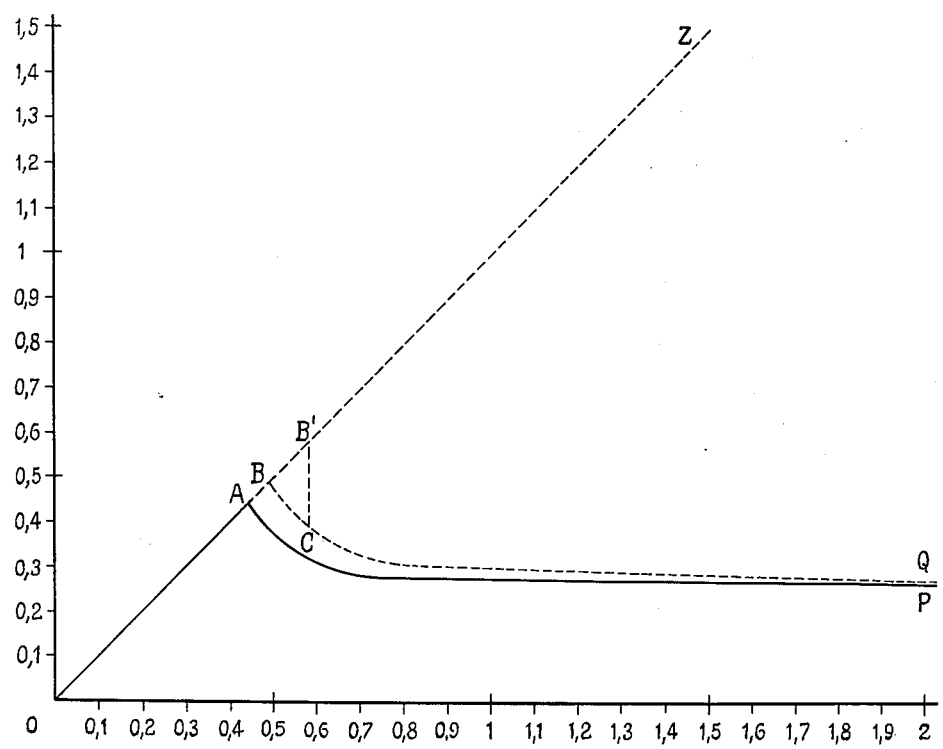
INVENTORS
GASTON AMIARD
ROBERT JOLY
LEON VELLUZ
BY
Klein Hart
ATTORNEYS 2,734,919
Patented Feb. 14, 1956

2,734,919

METHOD OF RESOLVING DL-THREO-1-(p-NITRO PHENYL)-2-AMINO PROPANE-1,3-DIOL

Gaston Amiard, Noisy-le-Sec, Robert Joly, Montmorency, and León Velluz, Paris, France, assignors to Les Laboratoires Francais de Chimiotherapie, Paris, France, a French body corporate Application February 25, 1953, Serial No. 338,854

Claims priority, application France November 28, 1952

12 Claims. (Cl. 260—570.6)

The present invention relates to a method of resolving the racemic DL-threo-1-(p-nitrophenyl)-2-amino propane-1,3-diol, an important intermediate in the synthesis of the antibiotic chloramphenicol, into its optically active components, and more particularly to a method of resolving said racemic base into the D(-) threo-1-(p-nitro phenyl)-2-amino propane-1,3-diol.

It is known that the antibiotic chloramphenicol which was first obtained by fermentation from the strain *Streptomyces venezuela* is also produced synthetically, said synthetic process, at present, being responsible for the production of most of said antibiotic. The last stage of this synthetic process of chloramphenicol of the following Formula I

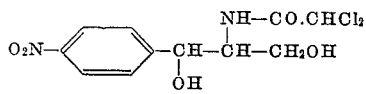

consists in condensing D(-) threo-1-(p-nitro phenyl)-2-amino-propane-1,3 diol of the following Formula II

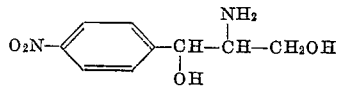

with a reactive derivative of dichloro acetic acid, such as its methyl ester. The step preceding this last condensation step of the chloramphenicol synthesis, consists in resolving the racemic base of Formula II into its optically active components and, more particularly, into its "D"-form. According to U. S. Patent No. 2,483,885 such resolution is effected by preparing, for instance, the optically active d-camphosulfonic acid salts and subjecting said salts to fractional crystallisation. Said resolving process requires, as is evident, the additional use of said optically active acid as an auxiliary substance.

This method is not always consistently reliable either in results or yield.

It is one object of this invention to provide a simple and effective method of resolving the racemic threo-1-(p-nitro phenyl)-2-amino propane-1,3-diol into its optically active D- and L- forms without the addition of an auxiliary optically active compound.

Another object of this invention is to provide a method of resolving said base into its optically active form by means of simple operations, thereby considerably increasing the yield of D(-) threo-1-(p-nitro phenyl)-2-amino propane-1,3-diol and, consequently the yield of chloramphenicol produced therefrom.

Other objects of this invention will become apparent from the specification and the examples given herein.

It has been found that the D- and L- forms of threo-1-(p-nitro phenyl)-2-amino propane-1,3-diol in supersaturated solutions in water will, upon disturbing the equilibrium of said two enanthiomorphic components in such supersaturated solutions, on subsequent cooling result in the precipitation of such enanthiomorphic components. It has also been found that if the racemic form of threo-1-(p-nitro phenyl)-2-amino propane-1,3-diol in supersaturated solutions in water has its equilibrium disturbed, it will also result, on subsequent cooling, in the precipitation of either the D- or L- form of said base, depending upon the manner of causing the disturbance of its equilibrium—all as set forth in greater detail hereinafter.

It has been found that the D-base, on adding a large excess thereof to water of 20° C., while stirring, is dissolved to an amount of 0.26%; whereas when dissolving 0.45 g. of said D-base in 100 cc. of water of 80° C. and subsequently cooling the solution to 20° C., no crystallization takes place, even after seeding, scratching or rubbing and prolonged agitation. This demonstrates that the D-form, when dissolved at elevated temperature and cooled, forms a supersaturated solution of 0.45%. However, on dissolving 0.6 g. of said D-base in 100 cc. of water of 80° C. and cooling the solution to 20° C., crystallization sets in more readily and only 0.32% of said base remains in solution. These results show clearly a tendency on the part of the D-base to form supersaturated solutions. The same procedure with respect to the L-base brings about the same result.

Varying the amounts of said bases and graphically illustrating the results, a curve is obtained which is shown in the accompanying drawing. Said graph indicates:

*Axis of abscissa.*—Weight in g. of D- or L- base dissolved in 100 cc. of water of 80° C.

*Axis of ordinates.*—Weight in g. of D- or L- base remaining in solution in 100 cc. of water at 20° C.

Straight line OZ in said graph represents the concentrations of solutions which do not crystallize. Abcissas and ordinates of said line indicate equal values.

Solutions containing more than 0.45 g. of the base in 100 cc. of water crystallize on cooling to 20° C. (point A). At that temperature, the amount of base remaining in solution depends on the amount of base which was initially dissolved. This function is illustrated by curve A P. Curve O A P corresponds to the amounts by weight of base D or L which remain in solution at 20° C. The existence of point A at which retrogression of the curve begins, shows clearly that the rate of supersaturation of solutions of base D or L decreases with increasing amounts of originally dissolved base.

The influence of one enantiomorphic compound upon the solubility of the other enantiomorphic compound and on the phenomenon of supersaturation demonstrated above was also studied.

For this purpose, given quantities of base D were dissolved in water, at 80° C., in the presence of equal quantities of base L. The solutions were then cooled to 20° C. Crystallization was initiated by seeding with base D, scratching and rubbing while stirring at said temperature. The solutions were filtered and the weight of the base remaining in solution was determined. In this way a number of results were obtained which are compiled in the following table:

| Weight of base D dissolved in 100 cc. of water at 80° C. | Weight of base L dissolved in 100 cc. of water at 80° C. | Total weight of base D and L remaining dissolved in 100 cc. of water at 20° C. | Weight of base D remaining dissolved in 100 cc. of water at 20° C. |
|---|---|---|---|
| Gram | Gram | Gram | Gram |
| 0.45 | 0.45 | 0.9 | 0.45 |
| 0.5 | 0.5 | 1.0 | 0.5 |
| 0.6 | 0.6 | 0.786 | 0.393 |
| 0.8 | 0.8 | 0.624 | 0.312 |
| 1.0 | 1.0 | 0.612 | 0.306 |
| 2.0 | 2.0 | 0.564 | 0.282 |

Graphically, these values permit the construction of dotted curve A B Q which expresses the influence of base L, when dissolved to the same extent as base D, upon the rate of supersaturation of the mother liquor at 20° C. The existence of point B, at which retrogression of the dotted curve begins (the values of the co-ordinates of said point B being greater than those of corresponding point A) shows that, in the presence of base L, the above described phenomenon also occurs, namely that the rate of supersaturation decreases with increasing amounts of precipitated base.

Conditions whereby 1 g. of the racemic base (i. e. 0.5 g. of base D and 0.5 g. of base L) and additionally 0.1 g. of base D are dissolved in 100 cc. of water at 80° C., which solution consequently contains 0.5 g. of base L and 0.6 g. of base D, are graphically represented by points B (for 0.5 g. of base L) and B' (for 0.6 g. of base D). On cooling such a solution to 20° C., base L remains in its supersaturated solution while base D precipitates to such an extent that the amount of said base D remaining in solution at 20° C. corresponds to point C. At said point C only about 0.4 g. of base D remain in solution and, consequently, 0.2 g. thereof have precipitated. This amount clearly exceeds by 0.1 g. or 100% that added additionally to the solution at 80° C. It follows that the step of adding base D to a mixture of equal amounts of bases L and D, in racemic form, directly produces a precipitate of base D.

By varying the temperature of solutions of the racemic base and by working with an excess of the base to be precipitated, the resulting varying states of supersaturation cause separation from the solution of enantiomorphic compound represented by the compound added to said solution. These facts provide the base for a new and effective method of resolving DL-threo-1-(p-nitro phenyl)-2-amino propane-1,3-diol into its optically active components.

The new method may be carried out in different ways. According to one mode of operation an amount of the racemic base sufficient to produce a supersaturated noncrystallizing solution at room temperature is dissolved in warm water. A comparatively small amount of one of the optically active or enantiomorphic components of said racemic base is added to and also dissolved in said solution. Thereafter the solution is cooled whereby, due to the above described disturbance in solubility equilibrium, the optically active component crystallizes in an amount exceeding the amount added to the solution. In order to precipitate said component in a comparatively pure state, it is advisable to dissolve such amounts of the racemic base as do not crystallize on cooling to the desired low temperature. When using higher amounts, not only the one optically active component will crystallize but also the other one and no satisfactory separation will be effected. When using lower amounts, the yield of said precipitated optically active component will be reduced. For instance, when dissolving 1.0 g. of the racemic base in 100 cc. of water of 80° C. and cooling the solution to 20° C., no precipitation will occur. Adding to the hot solution 0.1 g. of base D and cooling to 20° C., yields 0.2 g. of a precipitate which consists of substantially pure base D. Dissolving, instead of 1.0 g. of racemic base, only 0.9 g. thereof and adding to the hot solution 0.1 g. of base D, gives, on cooling to 20° C., only 0.02 g. of base D over the added amount. It follows that best results are obtained when adjusting the concentration of racemic base in the warm solution in such a manner that said base, at the temperature to which it is subsequently cooled, just remains in solution.

As is evident from the data given above, the solubility of the racemic base at low temperatures is rather low. To utilize the method according to this invention, therefore, requires comparatively large volumes of solutions to be heated, cooled, and worked up. It has been found, however, that this difficulty can be overcome in the following manner.

Some salts of the racemic base, especially the halogeno hydrates, such as the chlorohydrate and the bromohydrate, are highly soluble in water. This fact permits the reduction of the volume of the solution used for resolving the optically active components of said base. For this purpose, a mixture of such water soluble salts of the racemic base and of the racemic base itself is dissolved in water at elevated temperature, one of the enantiomorphic components of said racemic base is added to said solution, and said mixture of salt and base is then cooled whereby a larger amount of said one optically active component crystallizes than in the absence of such salt.

A mixture of soluble salt and base may also be prepared by dissolving the racemic base in warm water and partly acidifying the mixture by means of that acid, the salt of which one wishes to use. Likewise one may dissolve a water soluble salt of the racemic base in warm water and add to said solution an adequate amount of neutralizing agent, such as alkali hydroxide or carbonate. Said neutralizing agent partly converts the salt into the free racemic base, thus producing a mixture of salt and free base in solution. When adding to such a mixture one of the enantiomorphic components of said racemic base and then cooling the mixture, a larger amount of said one optically active component precipitates than in the absence of the water soluble salt of said racemic base.

The amount of enantiomorphic compound added to the hot solution of racemic base or of a mixture of racemix base and water soluble salt thereof is preferably between 2% by weight and 12% by weight of said base or mixture of base and salt. Its amount depends, as stated above, upon the temperature chosen for heating and cooling and is adjusted so that substantially only one of the enantiomorphic substances precipitates on cooling and no precipitation of the racemic base takes place.

After addition of the enantiomorphic compound and cooling the solution, the precipitated optically active compound is removed from the solution by filtration, centrifuging or any other means of separating solid substances from liquids.

The mother liquors contain now an excess of the other optical antipode. They are heated to a suitable temperature and an amount of racemic base is dissolved therein, which amount corresponds approximately to the amount that was removed from the original solution by cooling and precipitation. Thereby, the equilibrium of optical components is again disturbed; the hot solution contains more of the other optically active component. Therefore, on cooling, this other enantiomorphic compound crystallizes and is removed by filtration or the like.

After filtration of said precipitated optical antipode and addition of corresponding amounts of racemic base, the hot mother liquor has about the same composition as in the beginning of the procedure, i. e. it contains an excess of the first removed enantiomorphic component. On cooling, further amounts of said first mentioned optically active component are precipitated. On repeating this procedure, alternately, the one or the other of the optical antipodes is recovered. In this manner it is possible to cause complete resolution of the racemic base into its enantiomorphic components.

The following examples serve to illustrate this invention without, however, limiting the same thereto. It is to be understood, of course, that the temperature changes mentioned in the examples, i. e. from 80° C. to 20° C., from 45–50° C. to 25–27° C., and from 50–55° C. to 25–27° C. are only given by way of example and that the process according to this invention is not limited to said temperatures. One may heat the solution of the racemic base, for instance, to 60° C. and may then cool the mixture, after addition of one enantiomorphic compound, to 15° C. without departing from the principles of this invention. Likewise, it is, of course, possible to use other water soluble salts than the chlorohydrates, such as, for instance, the bromohydrates. The new resolving process according to this invention is not limited to the precise modes of manufacture hereinafter described in the examples nor to the precise order of addition of the enantiomorphic components, whether first the D-form and then the L-form is added or vice versa. The process according to this invention has proven to be of great importance in large scale production of chloramphenicol. Especially remarkable is the fact that even on such large scale operation uniform results are regularly obtained. In several hundreds of operations it was possible to resolve several tons of this important intermediate in the chloramphenicol synthesis into the desired optically active component.

*Example 1*

10 g. of racemic DL-threo-1-(p-nitro phenyl)-2-amino propane-1,3-diol and 1 g. of its D-form are dissolved in 100 cc. of water heated to 80° C. On cooling to 20° C., base D precipitates. 1.9 g. of said D(-)-threo-1-(p-nitro phenyl)-2-amino propane-1,3-diol are precipitated and filtered off. There remain in solution 5 g. of the base in L-form and 4.1 g. of the base in D-form, corresponding to a resolution of 1.8 g. of the racemic base.

The mother liquor is heated to 80° C. and 2 g. of racemic base are dissolved therein so that the solution contains 6 g. of the L-form and 5.1 g. of the D-form. Cooling the mixture to 20° C. yields a crystalline precipitate of 2.1 g. of base L which is filtered off. The mother liquor, thereafter, contains about 5.1 g. of the D-base and 3.9 g. of the L-base.

These operations may be repeated whereby alternately the D-base and the L-base are precipitated in crystalline form by adding in each instance 2 g. of the racemic base. It is advisable to carefully wash with water the isolated optical antipodes in order to completely remove therefrom any traces of the racemic base which might be adhering thereto.

*Example 2*

18.6 g. of racemic DL-threo-1-(p-nitro phenyl)-2-amino propane-1,3-diol and 1.4 g. of base L are dissolved in 35.3 cc. of 2 N hydrochloric acid and the solution is filled up with distilled water to 90 cc. The resulting mixture is heated to 45–50° C. until complete solution is acheived. Said solution is then slowly cooled, without agitation, to 25–27° C. The mixture is allowed to stand for 10 minutes at said temperature and the precipitate is removed by filtration. On drying, about 3 g. of base L is obtained.

To the resulting filtrate there are added 3 g. of racemic base. The mixture is then heated to 45–50° until complete solution is achieved. The solution is cooled to 25–27° C., the precipitate is filtered off and yields about 3 g. of base D.

To the filtrate obtained thereby, there are again added 3 g. of racemic base. The mixture is worked up as described above, and yields again 3 g. of base L.

When continuing this cycle of operation with the filtrate obtained in each preceding step, alternately the bases D and L are recovered in amounts which approximately correspond to the amounts of racemic base added to the filtrate each time the process is repeated.

The bases D and L obtained thereby contain only a small amount of the racemic base, i. e. as an average, about 5–6%. They are purified by washing with warm water. The pure D-base has the expected rotatory power of +28° to +29°, the pure L-base the rotatory power of −28° to −29° (concentration: 2% in 10% hydrochloric acid).

*Example 3*

585 g. of the crystalline chlorohydrate of racemic DL-threo-1-(p-nitro phenyl)-2-amino propane-1,3-diol containing 1 mol of water of crystallization, said amount corresponding to 465 g. of the free base, 35 g. of base D, and 2,250 cc. of water are heated to 50–55° C. until the compounds are completely dissolved. To said solution there are added 42.5 cc. of 40% sodium hydroxide solution which set free 90 g. of racemic base.

The resulting solution contains 471 g. of the chlorohydrate of the racemic base, corresponding to 375 g. of free base, 90 g. of free racemic base, and 35 g. of base D. The solution is cooled to 25–27° C., the crystalline precipitate is filtered off and washed with water. On drying, 75 g. of base L are obtained.

93.5 g. of the chlorohydrate of the racemic base, corresponding to 75 g. of said base, are added to the filtrate. The mixture is heated to 45–50° C. to cause complete solution. 35.5 cc. of 40% sodium hydroxide are added at the same temperature, i. e. a quantity required to set free an amount of racemic base equivalent to the amount of chlorohydrate added. The solution is cooled to 25° C. The crystalline precipitate is filtered off, washed with water, and dried. Thereby, 75.5 g. of base D are obtained.

The filtrate is worked up as often as 15 to 20 times in the manner described above, yielding alternately base L and base D.

In the preceding examples one may use, in the place of hydrochloric acid, other acids, such as hydrobromic acid, and, in the place of sodium hydroxide, other bases, such as potassium hydroxide, sodium carbonate, potassium carbonate, and ammonia.

Many other changes and variations may be made in the amounts of racemic base and its water soluble salts dissolved, in the addition of its enantiomorphic components, in the dissolving and cooling temperatures, in the recovery of the precipitated and crystallized optically active components and their purification and the like in accordance with the principles set forth herein and in the claims annexed hereto.

The prefixes "D-," "L-," and "DL-" employed herein conform to the IUPAC-rules as they are recommended on page 4522 of "Chemical and Engineering News" of October 27, 1952.

We claim:

1. In a method of resolving racemic DL-threo-1-(p-nitro phenyl)-2-amino propane-1,3-diol into its optically active components, the steps comprising dissolving the racemic base DL-threo-1-(p-nitro phenyl)-2-amino propane-1,3-diol at elevated temperature in water, the amount of said racemic base dissolved in said solution being sufficient to produce a saturated non-crystallizing solution at room temperature, adding to said solution and dissolving therein, while at a temperature between about 45° C. and about 80° C., one of the enantiomorphic components of said racemic base in an amount between about 2% by weight and about 12% by weight of said racemic base, cooling said solution to a temperature between about 15° C. and about 27° C., allowing the optically active component to crystallize, and removing the precipitated optically active threo-1-(p-nitro phenyl)-2-amino propane-1,3-diol from the mother liquor.

2. In a method of resolving racemic DL-threo-1-(p-nitro phenyl)-2-amino propane-1,3-diol into its optically active components, the steps comprising dissolving the racemic base DL-threo-1-(p-nitro phenyl)-2-amino propane-1,3-diol at elevated temperature in water, the amount of said racemic base dissolved in said solution being sufficient to produce a saturated, non-crystallizing solution at room temperature, adding to said solution and dissolving therein, while at a temperature between about 45° C. and about 80° C., one of the enantiomorphic components of said racemic base in an amount between about 2% by weight and about 12% by weight of said racemic base, cooling said solution to a temperature between about 15° C. and about 27° C., allowing the optically active component to crystallize, removing the precipitated optically active threo-1-(p-nitro phenyl)-2-amino propane-1,3-diol from the mother liquor to a temperature between about 45° C. and about 80° C., heating said mother liquor, adding to said heated mother liquor and dissolving therein the racemic base in an amount corresponding approximately to the precipitated and removed amount of optically active threo-1-(p-nitro phenyl)-2-amino propane-1,3-diol, cooling said solution to a temperature between about 15° C. and about 27° C., allowing the optically active component to crystallize, removing the precipitated optically active antipode of the first precipitated optically active threo-1-(p-nitro phenyl)-2-amino propane-1,3-diol, and several times repeating said steps of heating the mother liquor, adding thereto and dissolving therein racemic base in an amount corresponding approximately to the precipitated and removed amount of optically active threo-1-(p-nitro phenyl)-2-amino-propane-1,3-diol, cooling said solution, allowing the optically active component to crystallize, and removing the optically active components of said racemic base formed by each cycle of operation.

3. In a method of resolving racemic DL-threo-1-(p-nitro phenyl)-2-amino propane-1,3-diol into its optically active components, the steps comprising dissolving a water soluble salt of the racemic base DL-threo-1-(p-nitro phenyl)-2-amino propane-1,3-diol and said racemic base at elevated temperature in water, the amount of said racemic base dissolved in said solution being sufficient to produce, at room temperature, a saturated, non-crystallizing solution of said base in said salt solution, adding to said solution and dissolving therein, while at a temperature between about 45° C. and about 80° C., one of the enantiomorphic components of said racemic base in an amount between about 2% by weight and about 12% by weight of the total amount of free racemic base and its water soluble salt, cooling said solution to a temperature between about 15° C. and about 27° C., allowing the optically active component to crystallize, and removing the precipitated optically active threo-1-(p-nitrophenyl)-2-amino propane-1,3-diol from the mother liquor.

4. In a method according to claim 3, wherein the water soluble salt is the chlorohydrate.

5. In a method of resolving racemic DL-threo-1-(p-nitro phenyl)-2-amino propane-1,3-diol into its optically active components, the steps comprising dissolving the racemic base DL-threo-1-(p-nitro phenyl)-2-amino propane-1,3-diol at elevated temperature in water, adding to said solution an acid, forming with said racemic base a water soluble salt, the amount of said acid being insufficient to completely convert the racemic base into its salt, the amount of free racemic base present in said solution of salt and base being sufficient to produce, at room temperature, a saturated, non-crystallizing solution of said base in said salt solution, adding to said solution and dissolving therein, while at temperature between about 45° C. and about 80° C., one of the enantiomorphic components of said racemic base in an amount between about 2% by weight and about 12% by weight of the total amount of free racemic base and its water soluble salt, cooling said solution to a temperature between about 15° C. and about 27° C., allowing the optically active component to crystallize, and removing the precipitated optically active threo-1-(p-nitro phenyl)-2-amino propane-1,3-diol from the mother liquor.

6. In a method of resolving racemic DL-threo-1-(p-nitro phenyl)-2-amino propane-1,3-diol into its optically active components, the steps comprising dissolving a water soluble salt of the racemic base DL-threo-1-(p-nitro phenyl)-2-amino propane-1,3-diol at elevated temperature in water, adding to said salt solution a neutralizing agent in an amount insufficient to completely convert the salt into the free racemic base, the amounts of free racemic base present in said solution of salt and base being sufficient to produce at room temperature, a saturated, non-crystallizing solution of said base in said salt solution, adding to said solution and dissolving therein, while at a temperature between about 45° C. and about 80° C., one of the enantiomorphic components of said racemic base in an amount between about 2% by weight and about 12% by weight of the total amount of free racemic base and its water soluble salt, cooling said solution to a temperature between about 15° C. and about 27° C., allowing the optically active component to crystallize, and removing the precipitated optically active threo-1-(p-nitro phenyl)-2-amino propane-1,3-diol from the mother liquor.

7. In a method according to claim 6, wherein the neutralizing agent is an alkali hydroxide.

8. In a method according to claim 6 wherein the neutralizing agent is an organic base.

9. In a method of resolving racemic DL-threo-1-(p-nitro phenyl)-2-amino propane-1,3-diol into its optically active components, the steps comprising dissolving a water soluble salt of the racemic base DL-threo-1-(p-nitro phenyl)-2-amino propane-1,3-diol and said racemic base at elevated temperature in water, the amount of said racemic base dissolved in said solution being sufficient to produce, at room temperature, a saturated, non-crystallizing solution of said base in said salt solution, adding to said solution and dissolving therein, while at a temperature between about 45° C. to about 80° C., one of the enantiomorphic components of said racemic base in an amount between about 2% by weight and about 12% by weight of the total amount of free racemic base and its water soluble salt, cooling said solution to a temperature between about 15° C. and about 27° C., allowing the optically active component to crystallize, removing the precipitated optically active threo-1-(p-nitro phenyl)-2-amino-propane-1,3-diol from the mother liquod to a temperature between about 45° C. and about 80° C., heating said mother liquor, adding to said heated mother liquor and dissolving therein the racemic base in an amount corresponding approximately to the precipitated and removed amount of optically active threo-1-(p-nitro phenyl)-2-amino propane-1,3-diol, cooling said solution to a temperature between about 15° C. and about 27° C., allowing the optically active component to crystallize, removing the precipitated optically active antipode of the first precipitated optically active threo-1-(p-nitro phenyl)-2-amino propane-1,3-diol, and several times repeating said steps of heating the mother liquor, adding thereto and dissolving therein racemic base in an amount corresponding approximately to the precipitated and removed amount of optically active threo-1-(p-nitro phenyl)-2-amino propane-1,3-diol, cooling said solution allowing the optically active component to crystallize, and removing the optically active components of said racemic base formed by each cycle of operations.

10. In a method of resolving racemic DL-threo-1-(p-nitro phenyl)-2-amino propane-1,3-diol into its optically active components, the steps comprising dissolving a water soluble salt of the racemic base DL-threo-1-(p-nitro phenyl)-2-amino propane-1,3-diol at elevated temperature in water, adding to said salt solution a neutralizing agent in an amount insufficient to completely convert the salt into the free racemic base, the amount of free racemic base present in said solution of salt and base being sufficient to produce, at room temperature, a saturated, non-crystallizing solution of said base in said salt solution, adding to said solution and dissolving therein, while at a temperature between about 45° C. and about 80° C., one of the enantiomorphic components of said racemic base in an amount between about 2% by weight and about 12% by weight of the total amount of free racemic base and its water soluble salt, cooling said solution to a temperature between about 15° C. and about 27° C., allowing the optically active component to crystallize, removing the precipitated optically active threo-1-(p-nitro phenyl)-2-amino propane-1,3-diol from the mother liquor to a temperature between about 45° C. and about 80° C., heating said mother liquor, adding to said heated mother liquor the water soluble salt of the racemic base in an amount corresponding approximately to the precipitated and removed equivalent amount of optically active threo-1-(p-nitro phenyl)-2-amino propane-1,3-diol adding to said salt solution a neutralizing agent in an amount sufficient to neutralize said added water soluble salt of the racemic base and to convert said salt into the free racemic base without precipitating said base, cooling said solution to a temperature between about 15° C. and about 27° C., allowing the optically active component to crystallize, removing the precipitated optically active antipode of the first precipitated optically active threo-1-(p-nitro phenyl)-2-amino propane-1,3-diol, and several times repeating said steps of heating the mother liquor, adding thereto water soluble salts of said racemic base in an amount corresponding approximately to the precipitated and removed equivalent amount of optically active threo-1-(p-nitro phenyl)-2-amino propane-1,3-diol, adding to said salt solution a neutralizing agent in an amount sufficient to neutralize said added water soluble salt of the racemic base and to convert said salt into the free racemic base without precipitating said base, cooling said solution, allowing the optically active component to crystallize, and removing the optically active components of said racemic base formed by each cycle of operations.

11. In a method according to claim 10 wherein the water soluble salt of the racemic base is the chlorohydrate.

12. In a method according to claim 10 wherein the neutralizing agent is an alkali hydroxide.

References Cited in the file of this patent

UNITED STATES PATENTS

| | | |
|---|---|---|
| 2,264,928 | Blagden et al. | Dec. 2, 1941 |
| 2,483,884 | Crooks et al. | Oct. 4, 1949 |
| 2,483,885 | Crooks et al. | Oct. 4, 1949 |
| 2,650,938 | Gero | Sept. 1, 1953 |

OTHER REFERENCES

Gilman: "Organic Chemistry," Wiley and Sons, New York, N. Y., vol. I, pp. 187–188.

Schmidt: "Org. Chem.," 6th ed. (1950), p. 35.